United States Patent [19]

Vandervelden

[11] 3,926,370

[45] Dec. 16, 1975

[54] FLUORIDATION APPARATUS

[75] Inventor: Cornelius Keith Vandervelden, Kansas City, Mo.

[73] Assignee: Litton Industrial Products, Inc., Beverly Hills, Calif.

[22] Filed: Sept. 16, 1974

[21] Appl. No.: 506,260

[52] U.S. Cl. .................. 239/25; 239/317; 239/408; 239/432; 239/582; 239/590.3
[51] Int. Cl.$^2$ ..... E03B 9/20; B05B 7/28; B05B 7/12
[58] Field of Search ....... 239/25, 61, 310, 317, 408, 239/432, 581, 582, 590, 590.3

[56] References Cited
UNITED STATES PATENTS

| | | | |
|---|---|---|---|
| 1,681,362 | 8/1928 | Pike | 239/310 X |
| 1,687,085 | 10/1928 | Dow | 239/310 X |
| 1,859,218 | 5/1932 | Ramsey | 239/25 X |
| 1,967,909 | 7/1934 | Sonner | 239/317 X |
| 2,564,618 | 8/1951 | Williams | 239/310 X |
| 2,908,227 | 10/1959 | McDougall | 239/310 X |
| 3,181,797 | 5/1965 | Hayes | 239/317 |
| 3,191,868 | 6/1965 | Brown et al. | 239/310 X |
| 3,254,647 | 6/1966 | Vogel | 239/317 X |
| 3,581,996 | 6/1971 | Boyer | 239/317 |
| 3,652,015 | 3/1972 | Beall | 239/590.3 X |

FOREIGN PATENTS OR APPLICATIONS 1,142,879  2/1969  United Kingdom................. 239/317

*Primary Examiner*—Robert S. Ward, Jr.
*Attorney, Agent, or Firm*—Robert M. Vargo; Alan C. Rose

[57] ABSTRACT

A fluoridation apparatus is disclosed that is adapted to be attached to a water faucet for introducing minute concentrations of fluoride into the drinking water. The fluoridation apparatus comprises a main chamber and an adjacent reservoir chamber. The main chamber has an inlet in its upper portion for coupling to a water faucet and an outlet in its lowermost portion. By-pass and return conduits are provided for by-passing a portion of the water flowing through the main chamber into the reservoir chamber. The by-pass conduit includes a restriction formed therein, the flow through which is laminar. A quantity of fluoride compound is disposed within the reservoir of the adjacent chamber to saturate the water in the reservoir with fluoride ions. A proportionalizer is positioned within the main chamber forming a barrier between the inlet and outlet with the barrier having a plurality of relatively small conduits extending therethrough. The plurality of conduits divide the total flow into many separate flows to create a laminar flow condition in the proportionalizer. During operation (when the faucet water is turned on), a portion of the water passing through the main chamber is by-passed through the reservoir chamber to be saturated with fluoride particles. As the water flow continues, the fluoride saturated water is returned to the main chamber for mixing with the main stream of water passing through the proportionalizer.

15 Claims, 4 Drawing Figures

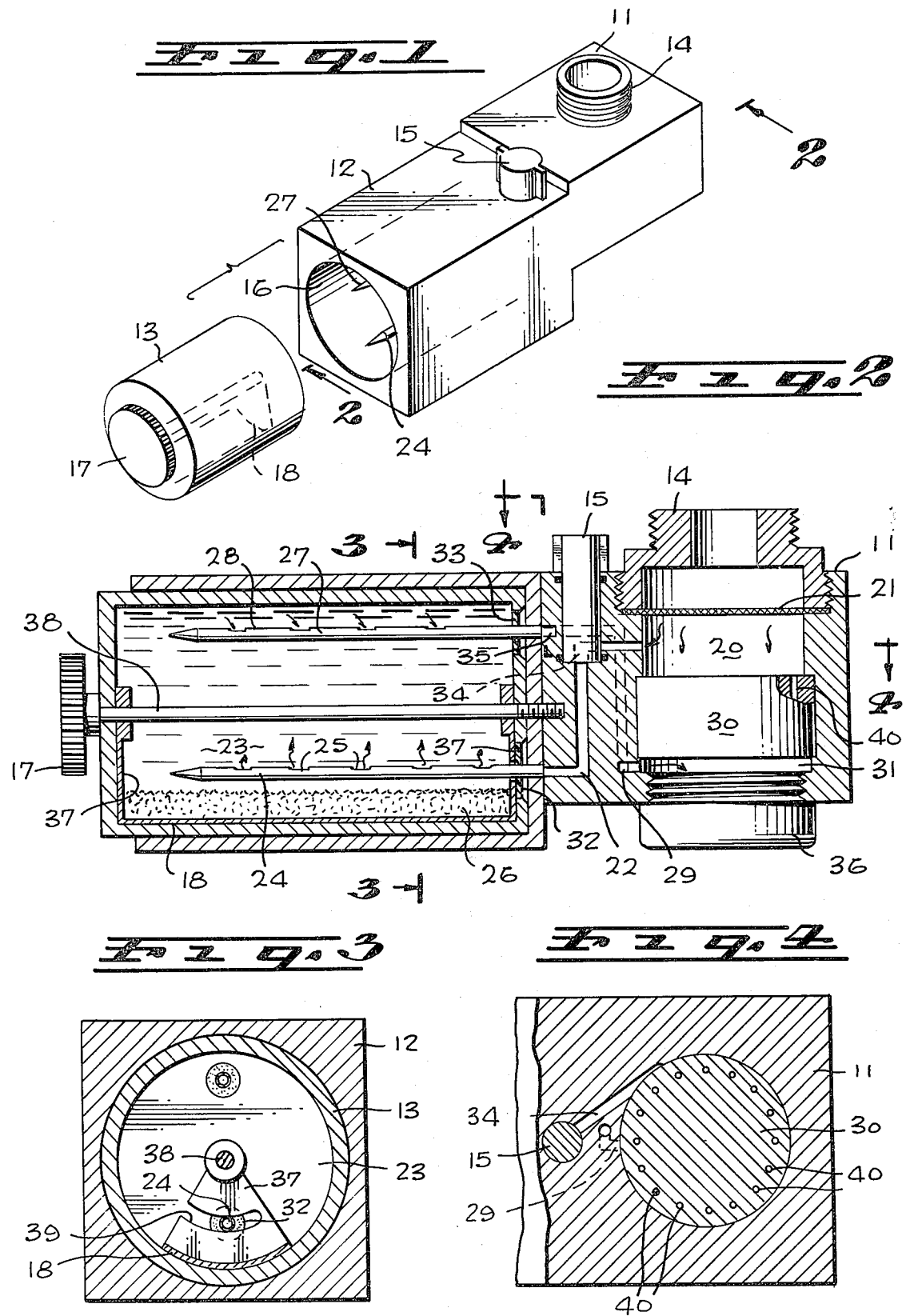

FLUORIDATION APPARATUS

BACKGROUND OF THE INVENTION

1. Field of the Invention

The present invention relates generally to apparatus for introducing relatively small amounts of soluble substances into a liquid, and more particularly to apparatus adapted to be attached to water faucets for introducing minute concentrations of fluoride into drinking water.

2. Description of the Prior Art

It is estimated that approximately half of the families in the United States do not have access to a fluoridated community water system or naturally fluoridated water. Out of a total of approximately 50 million families in the United States, approximately 25 million families do not have fluoridated drinking or cooking water.

There is abundant testimony in the literature stating that caries in a child can be reduced by two-thirds through the regular use of fluoridated water. Because of these advantages, different systems have been expounded to provide the families in areas where there is no fluoridated water system with a sufficient amount of fluoridated water for home use. One such system is a fluoridation apparatus that could be attached to a faucet, for example, in the kitchen of a home.

Heretofore, various fluoridation devices have been proposed for attachment to a faucet. However, these devices have suffered from various shortcomings which has prevented their widespread utilization.

The most serious shortcoming encountered in the previous fluoridation devices is that these devices were not able to accurately proportion the amount of fluoride per given amount of water and maintain a constant proportion under all operating conditions. (The preferred proportion of fluoride compound to water is one part per million, or 1 ppm). In most instances, the proportion would vary for different water pressures.

U.S. Pat. No. 3,919,868, issued Jan. 29, 1965, discloses a fluoridation device comprising a hollow outer casing having an inlet in its upper portion designed for coupling to a water faucet, and an outlet in the lower portion. A hollow inner casing is provided within the outer casing to contain a fluoride compound. A portion of the water passing through the outer casing is channeled through the inner casing to be saturated with fluoride particles. This fluoride saturated water is then reintroduced into the outer casing to mix with the main stream of water flowing therethrough. As stated previously, to maintain the constant proportion of fluoride particles per volume of water, it is important that the proper proportion of water flowing through the inner casing, with respect to the water flowing through the outer casing, remain constant under all flow, pressure and temperature conditions. However, this is not possible with such a device because, under normal operating conditions, the water flowing through the apparatus becomes turbulent. Because of such turbulence, it is impossible to channel the required amount of fluid through the inner chamber. Hence, the ppm of the fluoridated water varied significantly under varying pressure and flow conditions.

U.S. Pat. No. 2,842,429, issued July 8, 1958, discloses a fluoride dispenser that is similar to the fluoridation apparatus described above, and as a result, has the same proportioning problem discussed above.

SUMMARY OF THE INVENTION

The present invention obviates the above-mentioned shortcomings by providing a fluoridation apparatus that can properly dispense a water stream containing fluoride particles with an average concentration of 1 ppm over the entire operating range of the system.

In its broadest aspect, the present invention encompasses an apparatus for attachment to a liquid source, the apparatus comprising a main chamber and an adjacent reservoir chamber. The main chamber includes an inlet in its upper portion, adapted for coupling to the liquid source, and an outlet in its lower portion. The reservoir chamber has a quantity of chemical releasing substance disposed therein. A pair of by-pass conduits are provided to connect the interiors of the main and reservoir chambers. As the liquid passes through the reservoir chamber, it becomes saturated with the chemical substance to then be reintroduced into the main chamber and mix with the main stream of liquid passing therethrough. A proportionalizer is disposed within the main chamber for proportioning the ratio of the liquid flowing through the reservoir chamber with respect to the liquid flowing only through the main chamber. This proportionalizing ensures that the amount of chemical substance mixed into the exiting liquid is constant for all pressures, flow and temperature conditions.

The main advantage of the present invention is that it is especially adapted to function as a fluoride dispenser for releasing fluoride in drinking water.

The proportionalizer is an obstruction formed in the main chamber having a plurality of relatively small conduits extending therethrough. The main advantage of this structure is that the flow passing through these conduits and the by-pass conduits is caused to be laminar. As a result, the pressures of the water passing through the above-mentioned conduits is proportional to their flow. Therefore, for any given conduit sizes, the proportion of water passing through the reservoir chamber can be maintained at a constant under all pressure and flow conditions.

The features of the present invention, which are believed to be novel, are set forth with particularity in the appended Claims. The present invention, both as to its organization and manner of operation, together with the further advantages thereof, may best be understood by reference to the following description taken in connection with the accompanying drawings.

BRIEF DESCRIPTION OF THE DRAWINGS

FIG. 1 is an exploded isometric view of the fluoridation apparatus of the present invention;

FIG. 2 is a sectional view of the fluoridation apparatus taken along lines 2—2 of FIG. 1;

FIG. 3 is a sectional view of the reservoir chamber taken along lines 3—3 of FIG. 2; and FIG. 4 is a sectional view of the main chamber taken along lines 4—4 of FIG. 2.

DETAILED DESCRIPTION OF THE PREFERRED EMBODIMENT

Referring now to the drawings, FIG. 1 illustrates a fluoridation apparatus generally indicated by arrow 10 comprising a main housing 11, a reservoir housing 12 and a reservoir cartridge 13. The main housing 11 includes a threaded inlet 14 for coupling to a water faucet. The reservoir housing 12 includes a valve 15 extending through the top side thereof, the operation of which will be described hereinafter. The reservoir housing 12 further includes a cylindrical bore 16 which is adapted to receive the cylindrical reservoir cartridge 13. A knob 17 extends through one end of the reservoir cartridge 13 for controlling a mixer 18 (shown in broken lines) the function of which will be described hereinafter.

As shown in FIG. 2, the main housing 11 has a main chamber 20 having a screen 21 located therein for the normal filtering purposes. The main chamber 20 further includes a first by-pass conduit 22 which communicates with a reservoir 23 formed in the cartridge 13 by means of a pointed inlet tube 24. The inlet tube 24 includes a plurality of ports 25. The by-pass conduit 22 functions to by-pass a portion of the water passing through the main chamber 20 into the reservoir 23 by means of the inlet tube 24.

The reservoir 23 includes a quantity of fluoride compound 26 which functions to give off fluoride ions when contacted by the water. A pointed outlet tube 27 having outlet ports 28 formed therein is located in the upper portion of the reservoir 23 and is adapted to communicate with a second by-pass conduit 29 to enable the fluoride saturated water flowing out of the reservoir 23 to by-pass a proportionalizer 30 and enter an outlet compartment 31.

As stated previously, both the inlet and outlet tubes 24 and 27 are pointed. This pointed construction enables the tubes to pierce a pair of membranes 32 and 33, respectively, located on one side of the reservoir cartridge 13. As a result, the reservoir cartridge 13 can be easily positioned into the reservoir housing 12 and be easily removed and discarded when the reservoir 23 is empty of fluoride compound 26.

As shown more clearly in FIG. 2, the valve 15 is a rotatable valve and includes a pair of conduits 34 and 35, which are adapted to communicate in one position with the by-pass conduits 22 and 29, respectively. When the conduits 34 and 35 are taken out of communication with the by-pass conduits 22 and 29, all flow therethrough is stopped.

The outlet compartment 31 further includes an airator 36 mounted on the bottom side of the main housing 11.

As shown in FIGS. 2 and 3, the mixer 18 includes an arcuate plate 37 pivotally mounted to the shaft 38 which in turn is connected to the knob 17. The bladed portion of the mixer 18 functions to be turned by the shaft 38 via the knob 17 to mix the water to ensure that the fluoride ions are evenly distributed through the water. Although the water in the reservoir 23 is usually saturated with the fluoride ions, during long periods of non-use, the fluoride ions tend to settle to the bottom of the reservoir. A simple turning of the knob 17 is all that is required to obtain the mixing action. An arcuate groove 39 is formed on the inside arcuate plate 37 to receive the inlet tube 24 and enable the mixer 18 to function without interference from the tube 24.

As shown in FIGS. 3 and 4, the proportionalizer 30 is positioned within the main chamber 20 which separates the main chamber from the outlet compartment 31. The proportionalizer 30 includes a plurality of thin tube-like conduits 40 extending therethrough.

In operation, as the water from a faucet passes through the inlet 14 into the main chamber 20, a portion of the water flow is by-passed in a laminar flow condition through the by-pass conduit 22 and out through the inlet tube 24 into the reservoir 23. Because of the relatively small size of the by-pass conduits 22 and 29, the water passing therethrough is in a laminar state. The water in the reservoir 23 becomes saturated with fluoride ions by mixing with the fluoride concentration 26 (as stated earlier, the mixer 18 may be utilized to maintain the mixed condition). As more water is by-passed into the reservoir 23, fluoride saturated water exits through the outlet tube 27, through the second by-pass conduit 29 and into the outlet compartment 31. This fluoride saturated water is reunited with a major portion of the water flow passing through the proportionalizer 30.

According to the present invention, the plurality of small conduits 40 causes the water passing therethrough to be in a laminar condition. This feature coupled with the laminar flow through the by-pass conduits enables the pressure in the proportionalizer 30 and the by-pass conduits 22 and 29 to be proportional to the flow rate passing therethrough. As a result, the quantity of flow through the by-pass conduits 22 and 29 is directly proportional to the flow passing through the main chamber. This phenomenon is constant over the entire range of operating pressures. The proportion of by-pass flow with respect to the main flow is dependent upon only the relative area of the orifice sizes of the by-pass conduit 22 and the proportionalizer conduits 40. Because of this exact proportioning, under all pressure, temperature and flow conditions, the desired amount of fluoride particles in the water exiting the apparatus 10 is constant at all times.

It should be noted that various modifications can be made to the assembly while still remaining within the purview of the following claims.

What is claimed is:

1. An apparatus for connection to a liquid source, said apparatus comprising:
    a main chamber having an inlet in its upper portion adapted for coupling to the liquid source, and an outlet in its lower portion;
    a reservoir chamber located adjacent said main chamber, said reservoir chamber having a quantity of chemical releasing substance disposed therein;
    first and second by-pass conduits interconnecting the interiors of the main and reservoir chambers; and
    means located within said main chamber for proportioning the ratio of the liquid flowing through said reservoir chamber with respect to liquid flowing only through the main chamber under all pressure, temperature and flow conditions, said proportioning means separating said main chamber into an inlet compartment and an outlet compartment, said first by-pass conduit interconnecting the interiors of the inlet compartment and the reservoir chamber, said first by-pass conduit being sufficiently small to enable the liquid flow therethrough to be laminar, and said second by-pass conduit interconnecting the interiors of the outlet compartment and the reservoir chamber.

2. The combination of claim 1 wherein said proportioning means comprises a thick wall located between said inlet and outlet compartments, said wall having a plurality of small conduits extending therethrough for enabling the liquid flow therethrough to be laminar.

3. The combination of claim 2 wherein the upper portion of said main chamber is adapted for coupling to a water faucet.

4. The combination of claim 3 wherein said chemical releasing substance comprises a fluoride compound.

5. The combination of claim 1 further including an aerator connected to the outlet of said main chamber.

6. The combination of claim 2 wherein said conduits are 0.020 inch in diameter.

7. The combination of claim 1 wherein said first by-pass conduit further includes means for diffusing the liquid flow through said first by-pass conduit.

8. The combination of claim 1 wherein said second by-pass conduit further includes a nozzle extending into said outlet compartment of said first chamber.

9. The combination of claim 1 wherein said first by-pass conduit includes a valve.

10. An apparatus for connection to a liquid source, said apparatus comprising:
a main chamber having an inlet in its upper portion adapted for coupling to the liquid source, and an outlet in its lower portion;
a reservoir chamber located adjacent said main chamber, said reservoir chamber having a quantity of chemical releasing substance disposed therein;
means for by-passing a portion of the liquid flowing through the main chamber into said reservoir chamber, said by-pass means further creating a laminar flow therethrough; and
means for proportionalizing the ratio of the liquid flowing through said reservoir chamber with respect to the liquid flowing only through the said main chamber, said proportionalizing means further comprising means for creating a laminar flow therethrough, said proportionalizing means comprising a wall separating said main chamber into an inlet compartment and an outlet compartment, said laminar flow means comprising a plurality of conduits extending through said wall.

11. The combination of claim 10 wherein said conduits extend longitudinally within said main chamber and are 0.020 inch in diameter.

12. The combination of claim 11 wherein said conduits are located in a circle formed on said wall.

13. The combination of claim 10 wherein said by-pass means further includes means for diffusing the liquid flowing through said by-pass means.

14. An apparatus for connection to a liquid source, said apparatus comprising:
a main chamber having an inlet in its upper portion adapted for coupling to the liquid source, and an outlet in its lower portion;
a reservoir chamber located adjacent said main chamber, said reservoir chamber having a quantity of chemical releasing substance disposed therein;
first and second by-pass conduits interconnecting the interiors of the main and reservoir chambers; and
means for proportioning the ratio of the liquid flowing through said reservoir chamber with respect to liquid flowing only through the main chamber under all pressure, temperature and flow conditions, said reservoir chamber being removably attachable to said main chamber, said reservoir chamber comprising a wall adjoining said main chamber, said first and second by-pass conduits extending through said wall of said reservoir chamber, said first and said second by-pass conduits including means for piercing said wall of said reservoir chamber when being united with said main chamber.

15. An apparatus for connection to a liquid source, said apparatus comprising:
a main chamber having an inlet in its upper portion adapted for coupling to the liquid source, and an outlet in its lower portion;
a reservoir chamber located adjacent said main chamber, said reservoir chamber having a quantity of chemical releasing substance disposed therein;
first and second by-pass conduits interconnecting the interiors of the main and reservoir chambers; and
means for proportioning the ratio of the liquid flowing through said reservoir chamber with respect to liquid flowing only through the main chamber under all pressure, temperature and flow conditions, said second by-pass conduit further including means for diffusing the liquid flow through said second by-pass conduit.

* * * * *